(12) United States Patent
Golat et al.

(10) Patent No.: US 12,034,198 B2
(45) Date of Patent: Jul. 9, 2024

(54) TUNABLE WILKINSON SPLITTER

(71) Applicant: pSemi Corporation, San Diego, CA (US)

(72) Inventors: Joseph Golat, Crystal Lake, IL (US); David Kovac, Arlington Heights, IL (US)

(73) Assignee: pSemi Corporation, San Diego, CA (US)

( * ) Notice: Subject to any disclaimer, the term of this patent is extended or adjusted under 35 U.S.C. 154(b) by 677 days.

(21) Appl. No.: 17/143,011

(22) Filed: Jan. 6, 2021

(65) Prior Publication Data

US 2022/0216582 A1  Jul. 7, 2022

(51) Int. Cl.
*H01P 5/16* (2006.01)
*H04B 1/401* (2015.01)

(52) U.S. Cl.
CPC ............... *H01P 5/16* (2013.01); *H04B 1/401* (2013.01)

(58) Field of Classification Search
CPC .. H01P 5/16; H01P 1/213; H01P 11/00; H01P 1/203; H01P 3/08; H01P 5/12; H01P 1/127; H01P 7/082; H01P 5/18; H04B 1/401; H04B 1/40; H04B 1/18; H04B 1/0458; H04B 1/00; H03H 7/48; H03H 7/06; H03H 7/09; H03H 11/28; H03H 9/6406; H03H 9/6433

See application file for complete search history.

(56) References Cited

U.S. PATENT DOCUMENTS

| | | | | |
|---|---|---|---|---|
| 5,489,880 | A * | 2/1996 | Swarup | H03H 7/48 333/204 |
| 8,040,204 | B2 * | 10/2011 | Brown | H01P 5/16 333/136 |
| 10,608,313 | B2 * | 3/2020 | Wang | H03H 7/48 |
| 2005/0227627 | A1 * | 10/2005 | Cyr | H04B 1/006 455/67.11 |
| 2008/0242346 | A1 * | 10/2008 | Rofougaran | H04B 1/0458 455/552.1 |
| 2017/0201218 | A1 * | 7/2017 | Wang | H04B 1/401 |
| 2019/0123735 | A1 * | 4/2019 | Reedy | H03H 11/28 |
| 2019/0149104 | A1 * | 5/2019 | Suravarapu | H01P 5/16 330/124 R |
| 2022/0321160 | A1 * | 10/2022 | Li | H04B 1/40 |

* cited by examiner

*Primary Examiner* — Lana N Le
(74) *Attorney, Agent, or Firm* — Steinfl + Bruno LLP

(57) ABSTRACT

Methods and apparatuses for providing a tunable Wilkinson power splitter are presented. According to one aspect, the tunable splitter includes tunable branches realized via lumped elements that provide controlled impedance and phase at different selectable center frequencies of operation. For each of the center frequencies, the tunable Wilkinson splitter has a performance according to a corresponding fixed center frequency Wilkinson power splitter provided by a relatively narrow instantaneous bandwidth. Over a number of the center frequencies supported, performances of the tunable Wilkinson splitter overlap to provide a combined performance having a desired wider bandwidth. According to another aspect, each of the tunable branches includes an LC network that includes tunable capacitors and inductors. One or more of the tunable Wilkinson power splitters can be cascaded to provide a performance according to a wider instantaneous bandwidth.

21 Claims, 15 Drawing Sheets

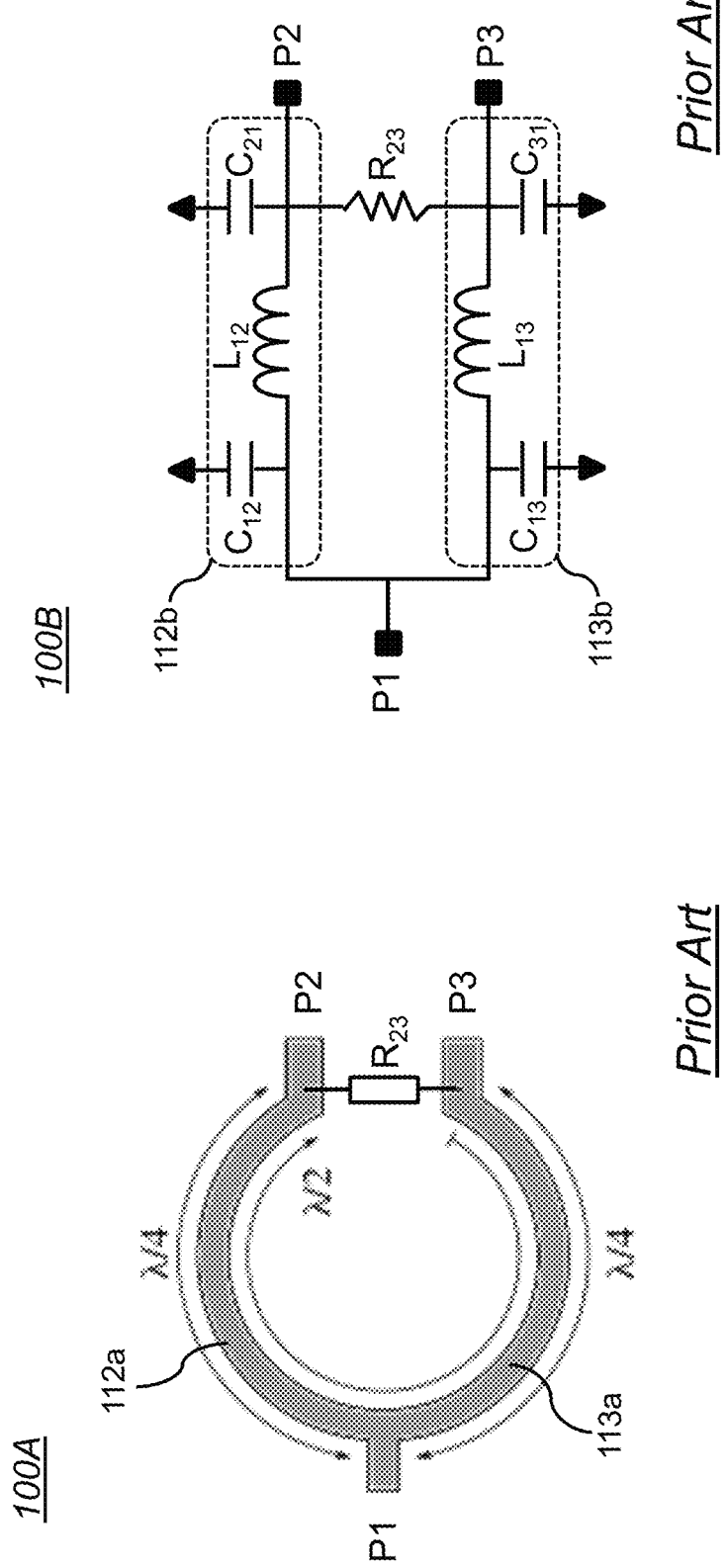

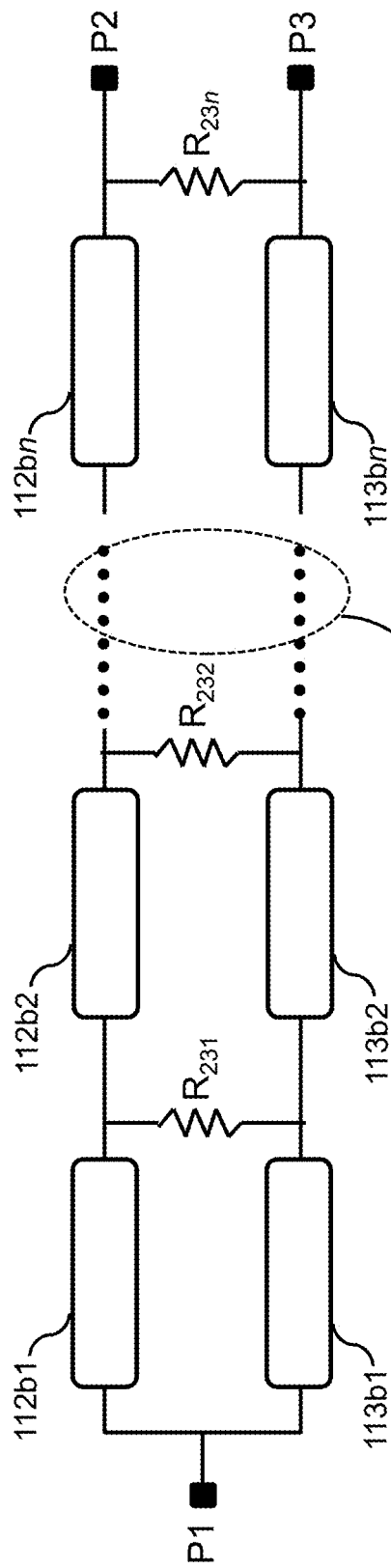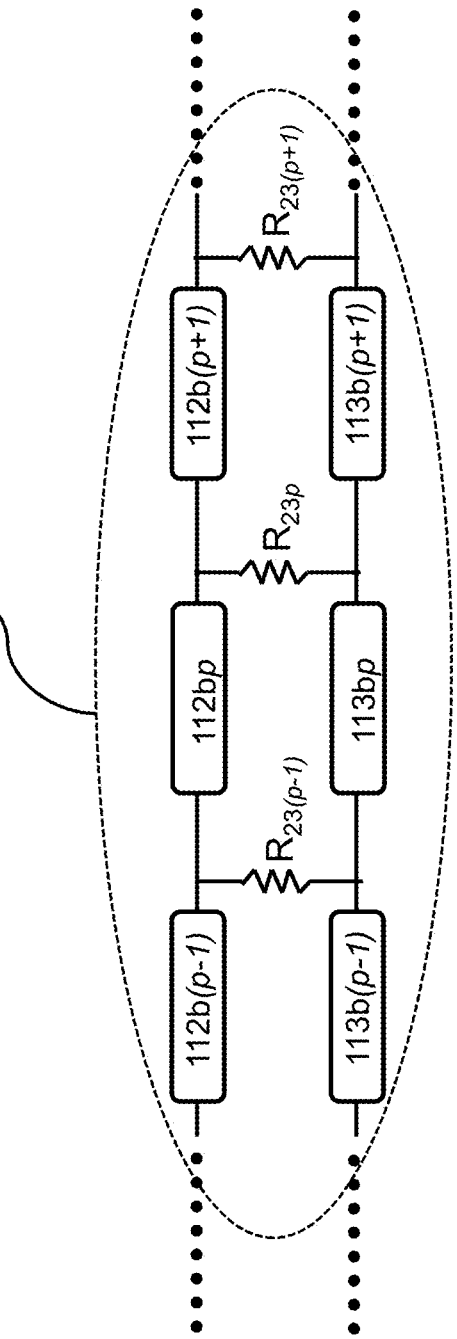
FIG. 2A *Prior Art*

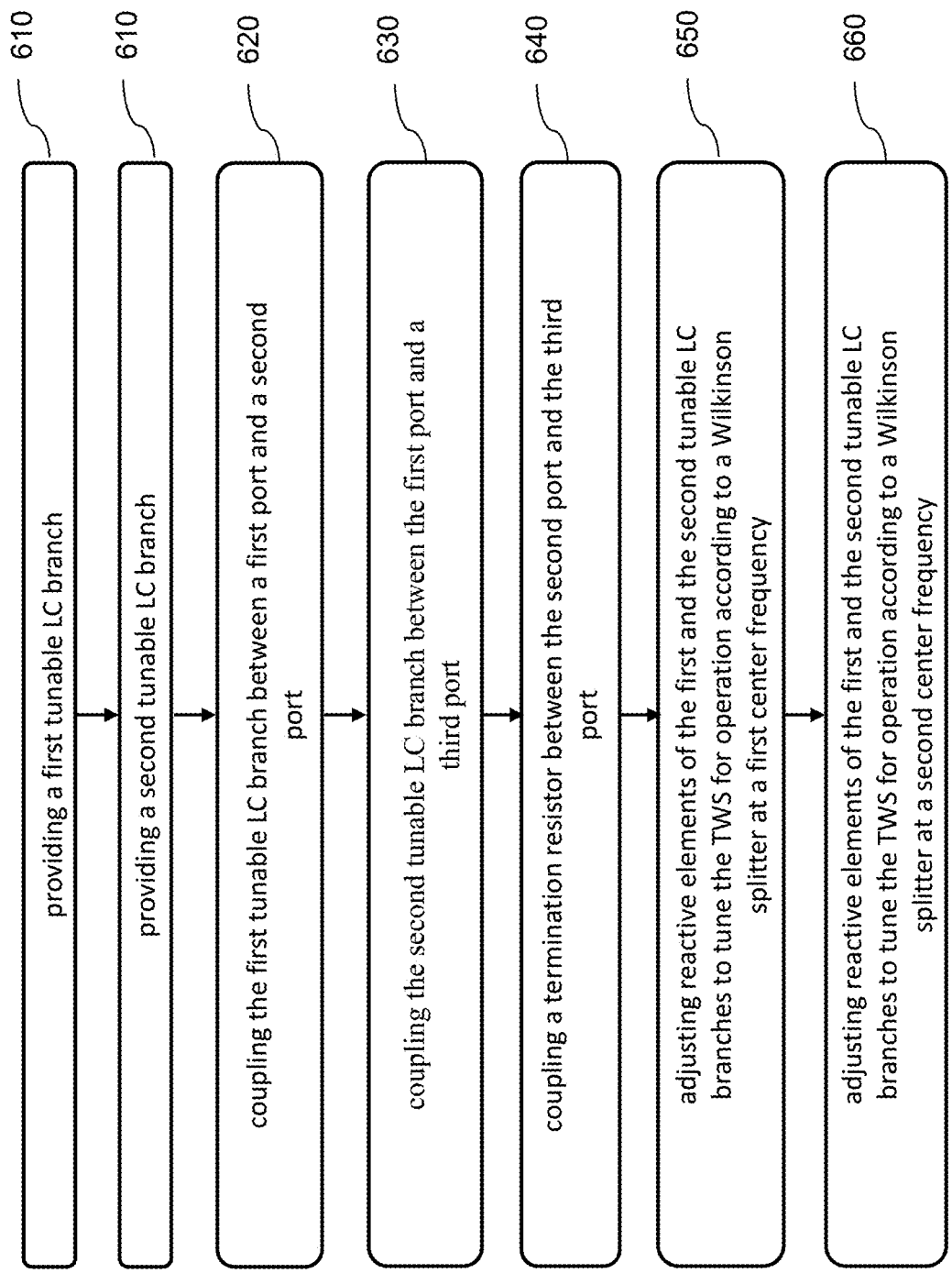

TUNABLE WILKINSON SPLITTER

TECHNICAL FIELD

The present teachings relate to radio frequency (RF) circuits. More particularly, the present teachings relate to methods and apparatuses for a tunable Wilkinson power splitter.

BACKGROUND

FIG. 1A shows a prior art Wilkinson (power) splitter (100A) that can be used to split an input RF signal at a (common) port, P1, into two (substantially) equal phase and (substantially) equal power RF signals at ports P2 and P3. Conversely, the splitter (100A) can be used to combine two equal phase RF signals at ports P2 and P3 into one RF signal at port P1. As can be seen in FIG. 1A, the prior art splitter (100A) is a three-port network, wherein ports P1 and P2 are coupled to respective ends of a first quarter wavelength (i.e., λ/4) transmission line (112a) and ports P1 and P3 are coupled to two respective ends of a second quarter wavelength (i.e., transmission line (113a). A termination resistor, $R_{23}$, coupled between ports P2 and P3 provides output impedance matching at the two ports P2 and P3, as well as isolation between ports P2 and P3 (i.e., essentially no current flows through the resistor). As known to a person skilled in the art, principle of operation of the splitter (100A) is based on: i) a length of the two transmission lines (112a, 113a) to be equal to one fourth (¼) of a wavelength, λ, that is based on a frequency of operation (i.e., center frequency) of the splitter (100A); and ii) in order to provide impedance matching between the port P1 and respective ports P2 and P3, at an impedance value $Z_O$, a characteristic impedance (i.e., impedance at the frequency of operation) of the two transmission lines (112a, 113a) must be equal to $\sqrt{2}*Z_O$, and the impedance of the termination resistor, $R_{23}$, must be $2*Z_O$.

Although the prior art splitter (100A) can operate at high frequencies (e.g., center frequencies of 10 GHz and higher) thanks to its distributed elements (e.g., transmission lines) realization, its bulkiness may render it impractical for integration purposes. Accordingly, in many applications, a lumped elements approach may be used to realize a Wilkinson splitter as shown in FIG. 1B. In such prior art approach, a Wilkinson splitter (100B) implements functionality (e.g., at the center frequency) of the two branches between port P1 and respective ports P2 and P3 via respective (Pi-) LC branches (112b) and (113b). As can be seen in FIG. 1B, each of the two branches (112b) and (113b) includes a respective inductor $L_{12}$, $L_{13}$, coupled at each end to respective shunted capacitors ($C_{12}$, $C_{21}$) and ($C_{13}$, $C_{31}$). For each of the branches (112b) and (113b), values of the respective elements ($L_{12}$, $C_{12}$, $C_{21}$) and ($L_{13}$, $C_{13}$, $C_{31}$) are chosen so that at the frequency of operation (i.e., center frequency), an equivalent impedance of each branch is equal to $\sqrt{2}*Z_O$ and a phase shift through the branches is equal (e.g., −90 degrees in reference to port P1). It should be noted that a person skilled in the art is well aware of design techniques and practices (e.g., matching of scattering parameters) for providing an equivalent lumped elements realization (e.g., 112b, 113b) of a transmission line (e.g., 112a, 113a) used in a distributed elements realization of a Wilkinson splitter, which are therefore beyond the scope of the present application.

FIG. 1C shows graphs representative of performance of the prior art splitter (100A, 100B) about an exemplary center frequency (e.g., 1.0 GHz), the performance as provided by known in the art scattering parameters (e.g., S11, S21, S22, S23 and S33). For example, as shown in FIG. 1C, an insertion loss performance provided by the parameter S21 about the center frequency (e.g., 1.0 GHz) remains better than −3.1 dB for a relatively narrow band (labeled as BW). Similarly, for the same narrow band, an isolation performance between ports P2 and P3 provided by the parameter S23 is better than −20 dB. As known to a person skilled in the art, an acceptable performance of the prior art splitter (100A, 100B) can be considered in view of the isolation between ports P2 and P3 (i.e., S23 parameter) to be better than −20 dB. Accordingly, the relatively narrow band BW may be considered as a bandwidth of the splitter at the center frequency (e.g., 1.0 GHz). In other words, performance of the splitter can be considered as acceptable for an operating frequency that is located within the bandwidth, BW. It should be noted that the performance of the prior art splitter as reflected in the graphs of FIG. 1C is inherent to the design of the Wilkinson splitter as described above with reference to FIG. 1A and FIG. 1B. Furthermore, it should be noted that the prior art splitter can be adapted to any center frequency, with a corresponding performance still reflected by the graphs shown in FIG. 1C, wherein the bandwidth, BW, is adjusted according to the center frequency based on a fractional bandwidth of the splitter (i.e., ratio of bandwidth to center frequency is substantially constant).

For applications that require a wider bandwidth than one provided by the prior art splitter (e.g., 100A, 100B), prior art implementations of a power divider may use a plurality of cascaded stages as shown in FIG. 2A. Such applications may include wide band support of cellular standards that may include a plurality of different frequency bands spanning over an extended (wide) range of frequencies (e.g., 1.2 GHz or larger), each band having a different center frequency and a relatively narrow bandwidth of operation (e.g., 0.5 GHz or smaller). One such example being the U-NII-5/6/7/8 radio band that is part of the radio frequency spectrum used, for example, by IEEE 802.11ax devices for wireless communication at frequency bands having center frequencies in the range of 5 to 7 GHz, or even to 8 GHz.

The prior art cascaded (power) splitter (200A) of FIG. 2A, includes plurality of stages (112b1, 113b1, $R_{231}$), . . . , (112bn, 113bn, $R_{23n}$), each such stage equivalent to the splitter (100B) described above with reference to FIG. 1B, or alternatively (not shown), equivalent to the splitter (100A) described above with reference to FIG. 1A. In particular, respective branches (112b1, 113b1) of the first stage (112b1, 113b1, $R_{23}$) are coupled at one end to the (common) port P1, and at the other end, to one end of respective branches (112b2, 113b2) of the next stage. Likewise, as can be clearly seen in the detail at the bottom of FIG. 2A, for any stage other than the first stage (112b1, 113b1, $R_{23}$), respective ends of the respective branches (e.g., 112bp, 113bp) are coupled to ends of branches of adjacent stages (112b(p−1), 113b(p−1), $R_{23(p-1)}$) and (112b(p+1), 113b(p+1), $R_{23(p+1)}$).

As shown in FIG. 2B, the cascaded configuration (200A) of FIG. 2A provides a relatively larger (e.g., about 3 times larger) bandwidth of operation, BW, as compared to the narrower bandwidth of the single stage configurations of FIG. 1A and FIG. 1B. It should be noted that the bandwidth, BW, shown in FIG. 2A is an "instantaneous" bandwidth, or in other words, such wider bandwidth is provided at all time during operation of the cascaded splitter (200A).

Another prior art approach for providing a wider bandwidth is shown in the configuration (200C) of FIG. 2C. In this approach, the wider bandwidth is provided by a plurality of single stage splitters (100B1, . . . , 100Bn), wherein at any given time of operation, only one of the plurality of single stage splitters is selected for processing of an RF signal. Selection is performed by a combination of an input switch $SW_{IN}$ and an output switch $SW_{OUT}$, wherein the input switch, $SW_{IN}$, couples a port $P1_{IN}$ of the configuration (200C) to a port P1 of a selected splitter of the plurality of single stage splitters (100B1, . . . , 100Bn) and the output switch, $SW_{OUT}$, couples ports $P2_{OUT}$ and $P3_{OUT}$ of the configuration (200C) to respective ports P2 and P3 of the selected splitter. In other words, the switches $SW_{IN}$ and $SW_{OUT}$ selectively couple ports (P1, P2, P3) of one of the plurality of single stage splitters (1001, . . . , 100Bn) to respective ports ($P1_{IN}$, $P2_{OUT}$, $P3_{OUT}$). Accordingly, the configuration (200C) of FIG. 2C provides a relatively narrow instantaneous bandwidth that is based on the relatively narrow bandwidth of a selected single stage splitter (e.g., per FIG. 1C described above). In other words, in the prior art configuration (200C), wide band support is provided by a plurality of relatively narrow instantaneous bandwidths, each having different center frequencies.

As described above, the prior art approach for providing a wider bandwidth relies on a plurality of single stage splitters (similar to splitters shown in FIGS. 1A and 1B) that are either cascaded to provide a wider instantaneous bandwidth or selected individually via switches to provide a plurality of narrow instantaneous bandwidths. Not only can such approaches be inefficient in terms of die area and component count which may negatively affect cost and integration of the splitter, but also can degrade performance due for example to signal losses incurred through the multiple cascaded stages (e.g., FIG. 2A) or through the switches (e.g., FIG. 2C).

Teaching according to the present disclosure describe a tunable Wilkinson power splitter for wider bandwidth support without the drawback of the prior art configurations.

SUMMARY

According to a first aspect of the present disclosure, a tunable Wilkinson splitter (TWS) is presented, the TWS comprising: a first tunable LC branch coupled between a first port and a second port; a second tunable LC branch coupled between the first port and a third port; and a termination resistor coupled between the second port and the third port, wherein the first and the second tunable LC branches are configured to be tuned to provide operation of the TWS according to a plurality of different center frequencies.

According to second aspect of the present disclosure, a multi-stage tunable splitter is presented, the multi-stage tunable filter comprising: a plurality of cascaded stages, each stage comprising first and second branches according to branches of a Wilkinson splitter that are coupled to one another at one end via a termination resistor, wherein at least one stage of the plurality of stages comprises first and second branches that are tunable LC branches to provide operation according to a plurality of different center frequencies.

According to a third aspect of the present disclosure, a tunable splitter is presented, the tunable splitter comprising: a number N of LC branches, each of the N LC branches coupled between a first port and a respective port of N ports, N being an integer number equal to or larger than three; and N termination resistors, each coupled between the respective port and a common node, wherein at least one of the N LC branches is a tunable LC branch that is configured to be tuned to provide operation of the tunable splitter according to a plurality of different center frequencies.

According to a fourth aspect of the present disclosure, a method for providing a tunable Wilkinson splitter (TWS) is presented, the method comprising: providing a first tunable LC branch; providing a second tunable LC branch; coupling the first tunable LC branch between a first port and a second port; coupling the second tunable LC branch between the first port and a third port; coupling a termination resistor between the second port and the third port, adjusting reactive elements of the first and the second tunable LC branches to tune the TWS for operation according to a Wilkinson splitter at a first center frequency; and adjusting reactive elements of the first and the second tunable LC branches to tune the TWS for operation according to a Wilkinson splitter at a second center frequency.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 1A shows a layout of a prior art Wilkinson splitter realized with distributed elements.

FIG. 1B shows a circuit of a prior art Wilkinson splitter realized with lumped elements.

FIG. 2A shows a circuit of an exemplary prior art splitter that uses a plurality of cascaded stages for operation over a wider band.

FIG. 3A1, FIG. 3A2, and FIG. 3A3 show various LC network topologies.

FIG. 6 is a process chart showing various steps of a method according to an embodiment of the present disclosure for providing a tunable Wilkinson splitter.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein.

The present disclosure describes electrical circuits in electronic devices (e.g., cell phones, radios, base stations, etc.) having a plurality of devices, such as for example, transistors (e.g., MOSFETs). Persons skilled in the art will appreciate that such electrical circuits comprising transistors can be arranged as amplifiers.

As used herein, the expression "operating frequency" can refer to a frequency of a signal being input to a device (such as an amplifier).

As used herein, the expression "center frequency" can refer to a reference frequency about which the operating frequency varies. The center frequency may be, for example, associated to a band or channel of operation of an RF communication system, and the operating frequency may be associated to a bandwidth of the band or channel of operation.

Figure 1C:
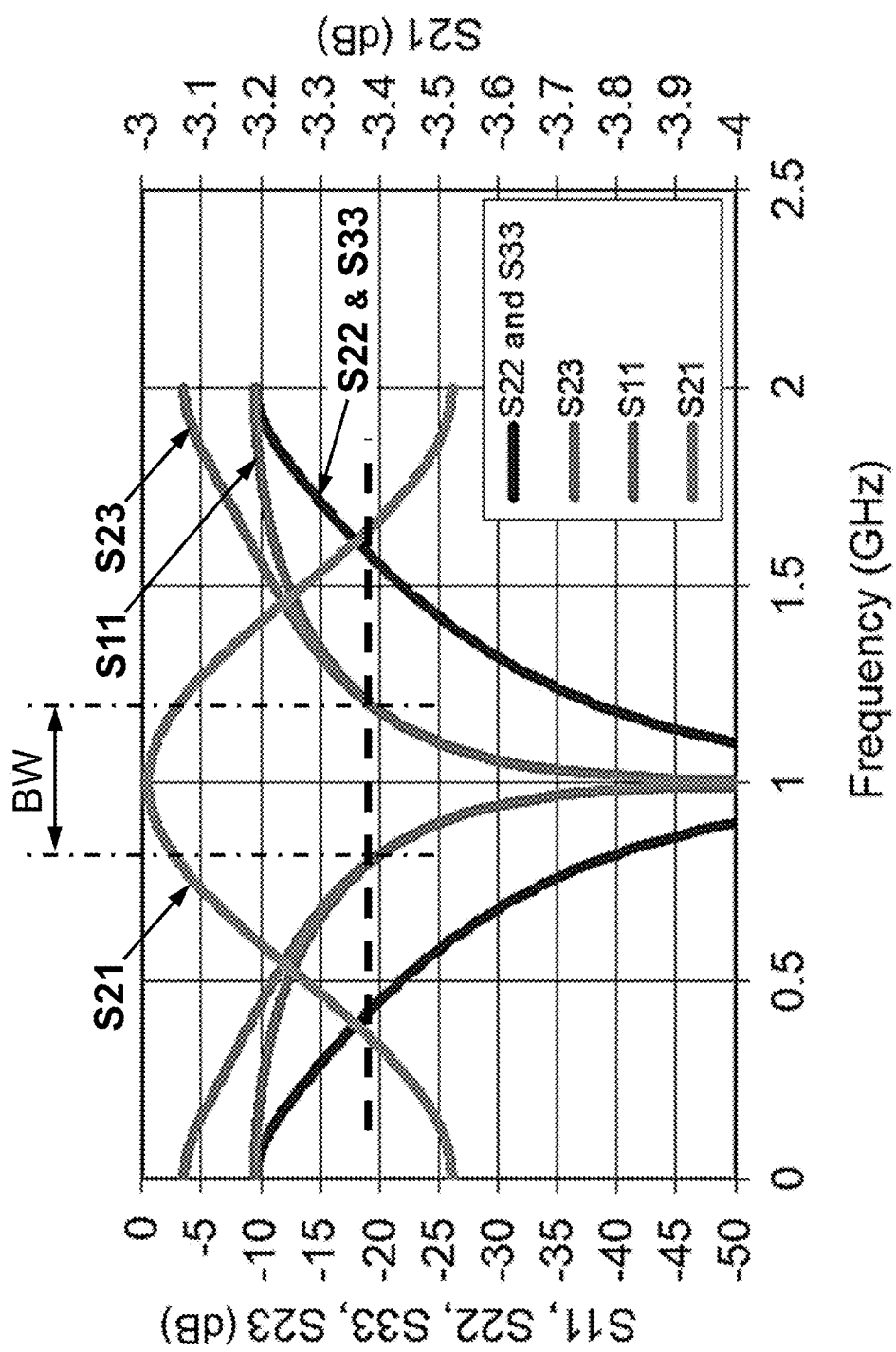
FIG. 1C shows graphs representative of performance of a prior art Wilkinson splitter.
Figure 3A:
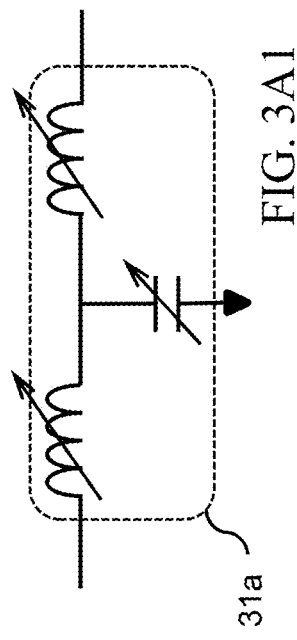
FIG. 3A shows a circuit of a tunable Wilkinson splitter according to an embodiment of the present disclosure.
Figure 3A:
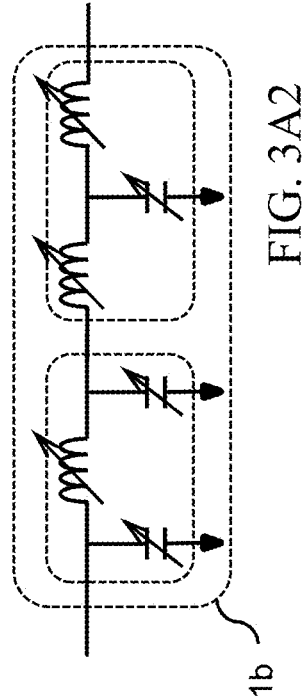
Figure 3A:
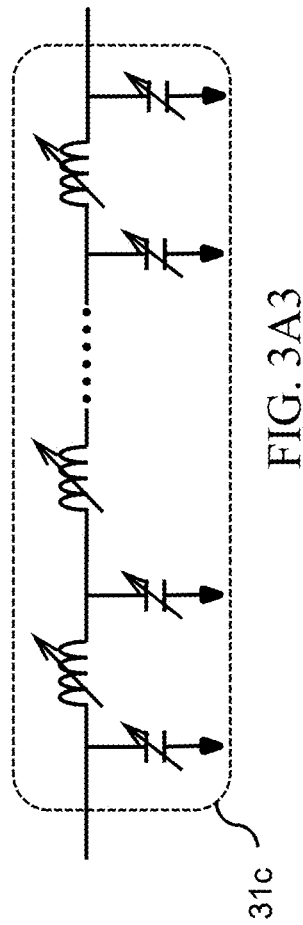
Figure 3A:
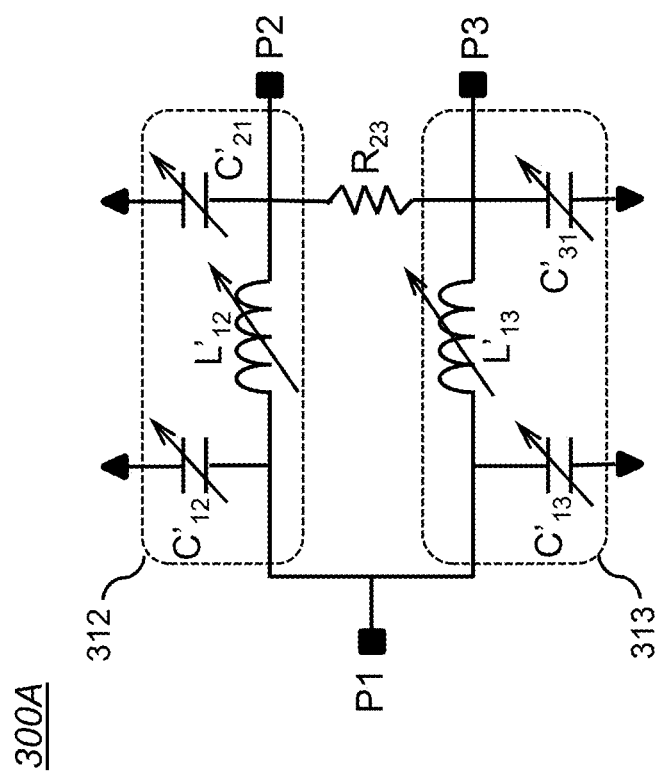

The present teachings overcome prior art shortcoming of wide band power splitter implementations described above by implementing a tunable Wilkinson (power) splitter as shown in FIG. 3A. Such tunable Wilkinson splitter (300A) includes two tunable branches (312) and (313) coupled at their respective ends to (common) port P1 and respective ports P2 and P3. Tuning of each of the branches is provided by adjustable/variable/configurable/tunable capacitive and inductive elements. For example, the tunable branch (312) of the splitter (300A) shown in FIG. 3A is coupled to port P1 and port P2, and includes adjustable elements ($C'_{12}$, $L'_{12}$, $C'_{21}$) configured according to an exemplary (Pi-) LC network similar to the network (112b) of FIG. 1B. Likewise, the tunable branch (313) of the splitter (300A) shown in FIG. 3A is coupled to port P1 and port P3, and includes adjustable elements ($C'_{13}$, $L'_{13}$, $C'_{31}$) configured according to an exemplary (Pi-) LC network similar to the network (113b) of FIG. 1B. Accordingly, the tunable branches (312) and (313) may be refereed herein as tunable LC branches, each comprising adjustable L and C elements.

With reference to the exemplary (Pi-) LC networks used in the tunable branches (312, 313) shown in FIG. 3A, it should be noted, that as known to a person skilled in the art, other LC network topologies different from the shown Pi networks may be used to control phase and amplitude through each of such tunable branches. Non limiting examples of such other topologies may include, for example, i) a known in the art tunable L-C-L (Tee-) network. (e.g., 31a) as shown in FIG. 3A1; ii) a combination (e.g., cascade) of a tunable Pi-LC network and a tunable Tee-LC network, (e.g., 31b) as shown in FIG. 3A2; or iii) a plurality of series-connected adjustable L elements combined with a plurality of shunted adjustable C elements, (e.g., 31c) as shown in FIG. 3A3. In other words, each of the tunable branches (e.g., 312, 313) may include an LC network of adjustable L and C elements that in combination can provide a desired phase and amplitude of a signal conducted though the branch. Furthermore, although for reasons of practicality a same topology may be used for both of the tunable branches, alternative implementations with different topologies are also envisioned and possible.

With continued reference to the tunable splitter (300A) of FIG. 3A, according to an embodiment of the present disclosure, at any time during operation of such splitter, relationship between values of the adjustable elements of the two branches (312) and (313) is configured to maintain the principle of operation of a Wilkinson splitter as described above with reference to the prior art Wilkinson splitter (e.g., 100A, 100B of FIGS. 1A, 1B). In other words, at any time during operation of the tunable splitter (300A), for each of the branches (312) and (313), values of the respective adjustable elements ($C'_{12}$, $L'_{12}$, $C'_{21}$) and ($C'_{13}$, $L'_{13}$, $C'_{31}$) are chosen so that at a frequency of operation (i.e., center frequency), an equivalent impedance of each branch is equal to $\sqrt{2}*Z_O$ and a phase shift through the branches is equal (e.g., −90 degrees in reference to port P1). Furthermore, similar to the above described prior art implementations, the termination resistor, $R_{23}$, having a value of $2*Z_O$ and coupled between ports P2 and P3, provides output impedance matching at the two ports P2 and P3, as well as isolation between ports P2 and P3 (i.e., essentially no current flows through the resistor). A person skilled in the art would clearly understand that the impedance $Z_O$ is based on a target system impedance, such as, for example, $Z_O$=50 Ohms.

With continued reference to the tunable splitter (300A) of FIG. 3A, according to an embodiment of the present disclosure, tuning of the adjustable elements ($C'_{12}$, $L'_{12}$, $C'_{21}$) and ($C'_{13}$, $L'_{13}$, $C'_{31}$) may be based on a desired frequency of operation of the tunable splitter (300A). In other words, a center frequency is selected, and then values of the adjustable elements ($C'_{12}$, $L'_{12}$, $C'_{21}$) and ($C'_{13}$, $L'_{13}$, $C'_{31}$) are set for operation according to a Wilkinson power splitter. In other words, the tunable splitter (300A) according to the present teachings can be configured (controlled) in real time for operation according to different center frequencies. For example, when implemented for support of multiple frequency bands of operation of a wireless communication system (e.g., U-NII-5/6/7/8 radio band), a signal-aware controller (e.g., a transceiver) may control the adjustable elements ($C'_{12}$, $L'_{12}$, $C'_{21}$) and ($C'_{13}$, $L'_{13}$, $C'_{31}$) in real time for operation according to a desired frequency band of the multiple frequency bands at one time, and for operation according to a different frequency band of the multiple frequency bands at another time.

Figure 3B:
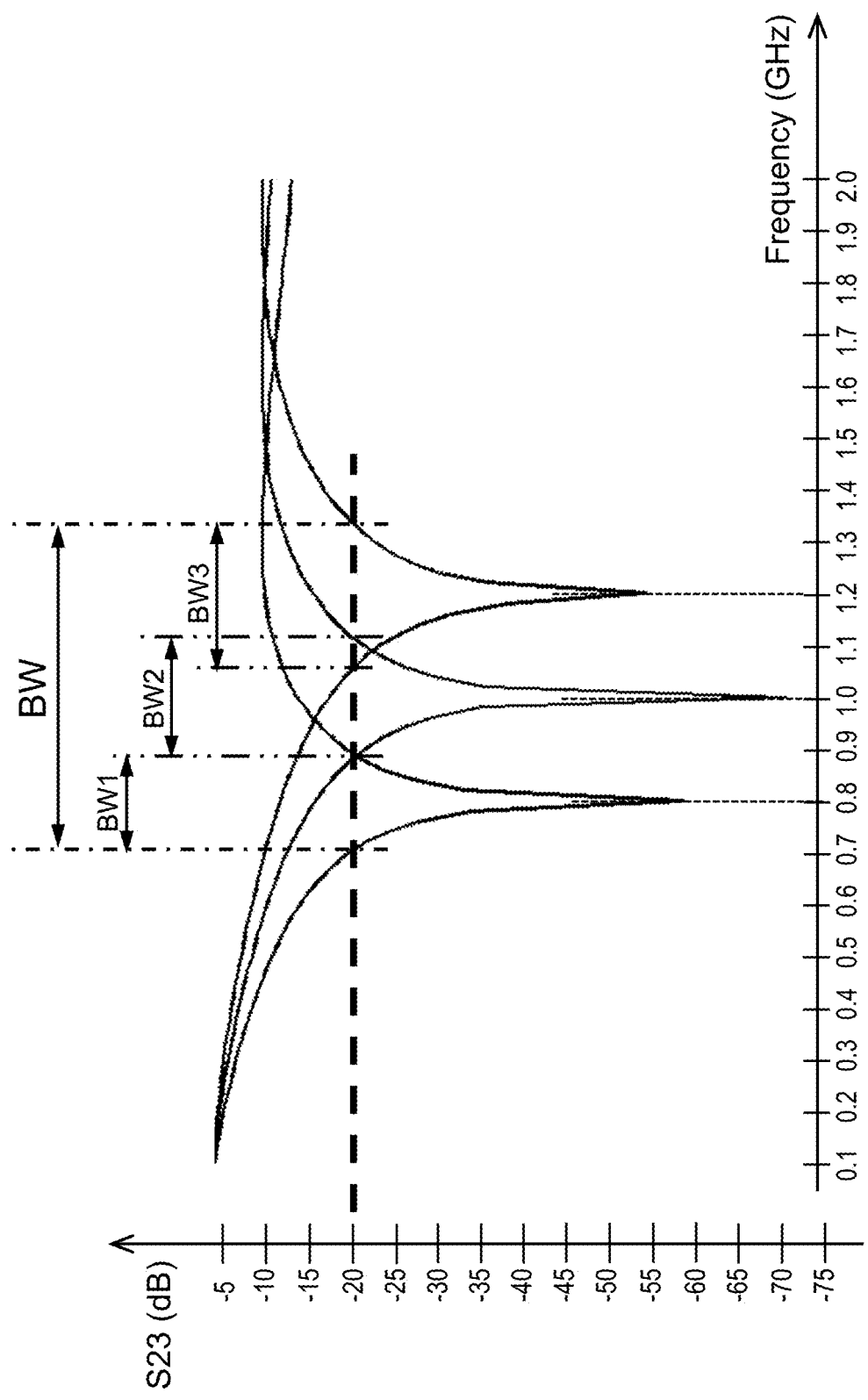
FIG. 3B shows graphs representative of an isolation-between-ports performance of the tunable Wilkinson splitter of FIG. 3A.
Figure 3C:
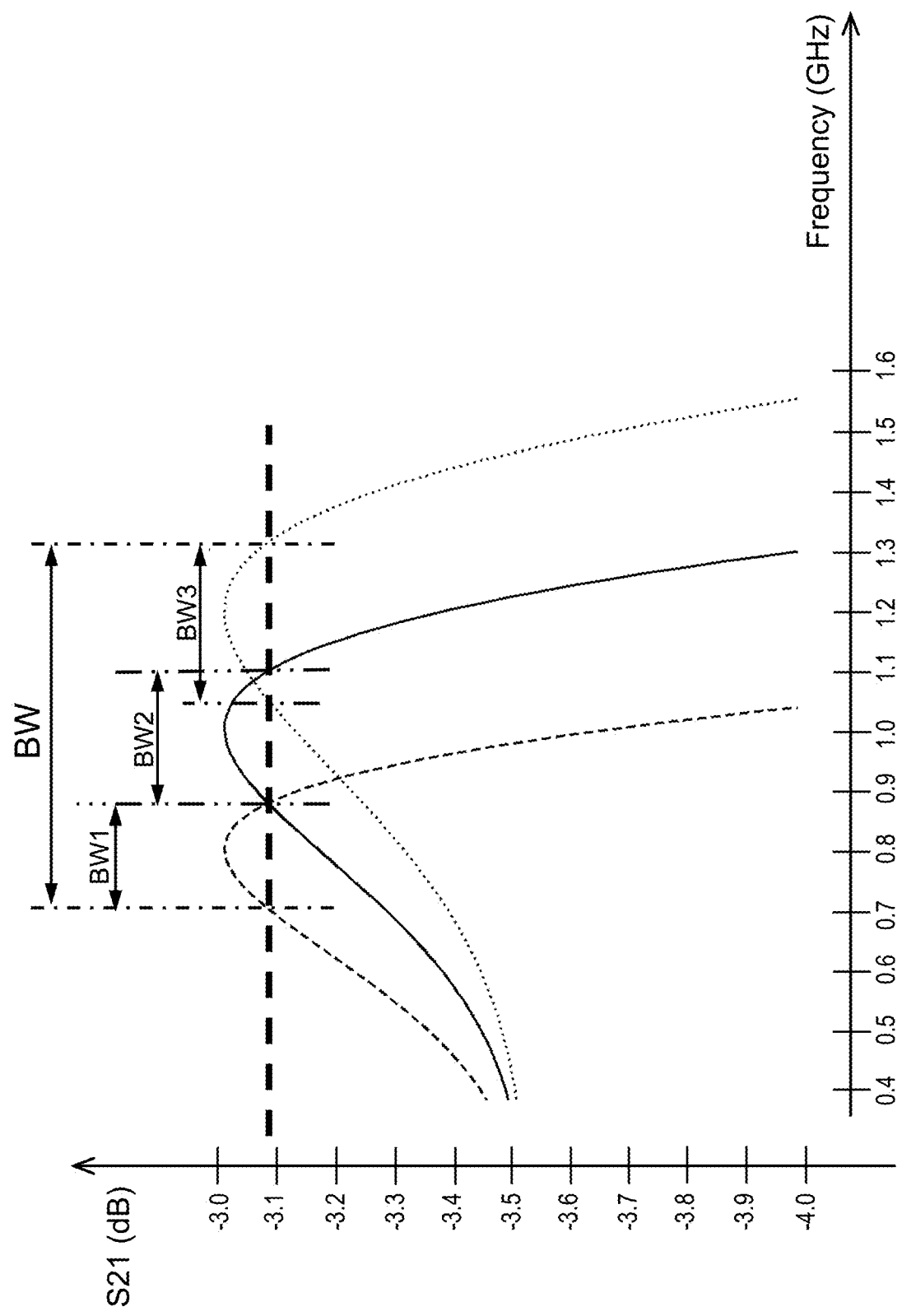
FIG. 3C shows graphs representative of an insertion loss performance of the tunable Wilkinson splitter of FIG. 3A.

FIG. 3B and FIG. 3C respectively show graphs representative of an isolation-between-ports (P2 and P3 represented by parameter S23) performance and an insertion loss performance (represented by parameter S21) of the tunable Wilkinson splitter (300A) of FIG. 3A during operation according to, for example, three different center frequencies (e.g., 0.8 GHz, 1.0 GHz and 1.2 GHz). As can be seen in the graphs of FIG. 3B and FIG. 3C, for each of the exemplary three center frequencies, a corresponding bandwidth (BW1, BW2, BW3) and performance as provided by a shape of the graph, is derived from the bandwidth and graph of the prior art Wilkinson splitter shown in FIG. 1C, adjusted for a different center frequency (e.g., per fractional bandwidth). As can be clearly understood by a person skilled in the art, the tunable Wilkinson splitter (300A) provides support for a wider band of operation (e.g., bandwidth BW) via a plurality of instantaneous relatively narrower bands of operation (e.g., BW1, BW2, BW3), each such relatively narrower band of operation provided by a performance of the prior art Wilkinson splitter described above with reference to FIGS. 1A-1C. As can be clearly seen in FIG. 3B, the bandwidths BW1, BW2 and BW3 overlap at frequency regions such as to provide a contiguous frequency region (e.g., BW) over which the isolation between ports P2 and P3 is better (greater) than, for example, −20 dB. Likewise, as can be clearly seen in FIG. 3C, the bandwidths BW1, BW2 and BW3 overlap at frequency regions such as to provide the contiguous frequency region (e.g., BW, same as one shown in FIG. 3B) over which the insertion loss is better (greater) than, for example, −3.1 dB. It should be noted that more or less width of the effective bandwidth, BW, can be obtained by supporting more of less center frequencies of operation, each such center frequency of operation being supported by a different set of values of the adjustable elements ($C'_{12}$, $L'_{12}$, $C'_{21}$) and ($C'_{13}$, $L'_{13}$, $C'_{31}$) to provide performance of a corresponding Wilkinson splitter.

Figure 2B:
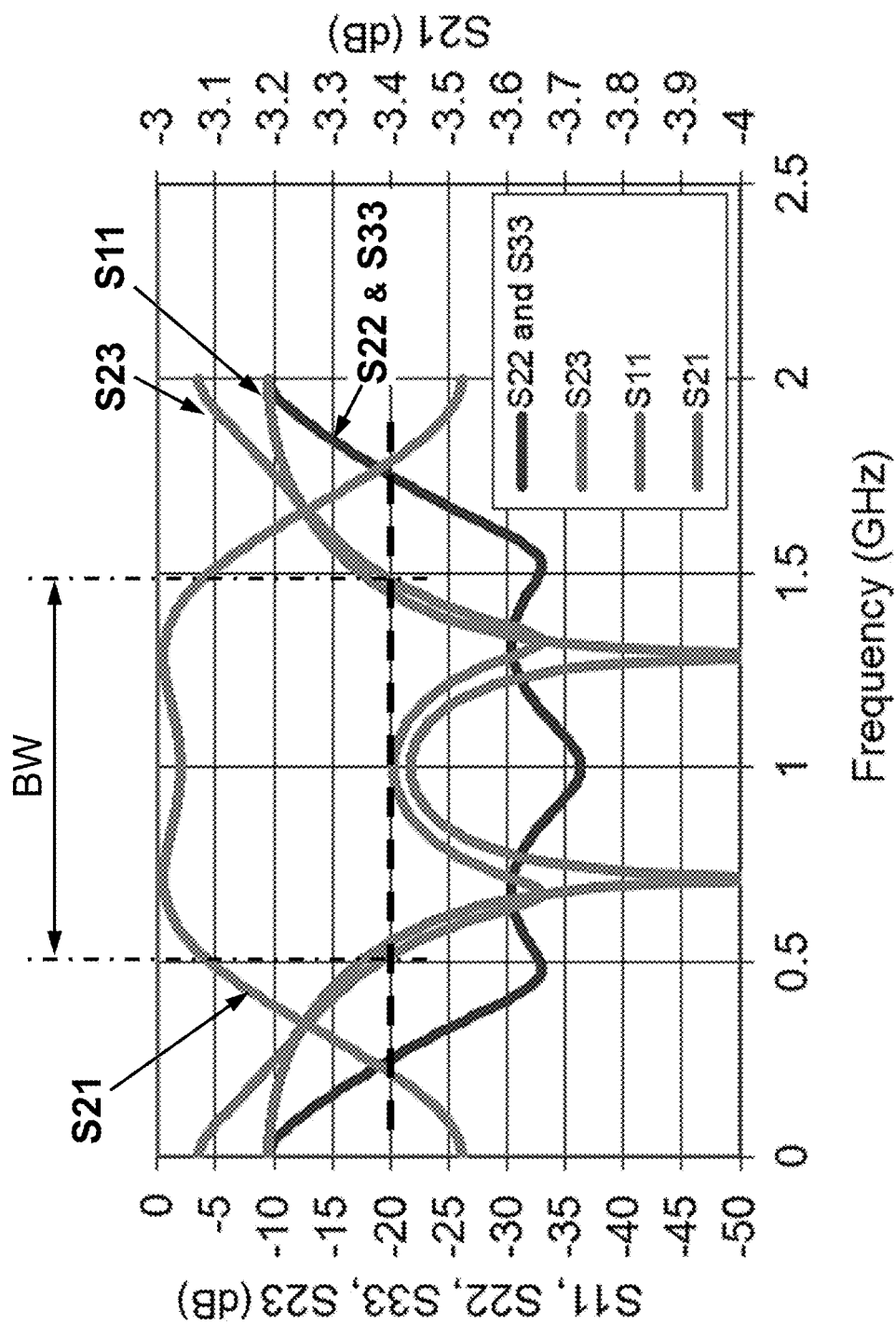
FIG. 2B shows graphs representative of performance of the prior art splitter of FIG. 2A.
Figure 2C:
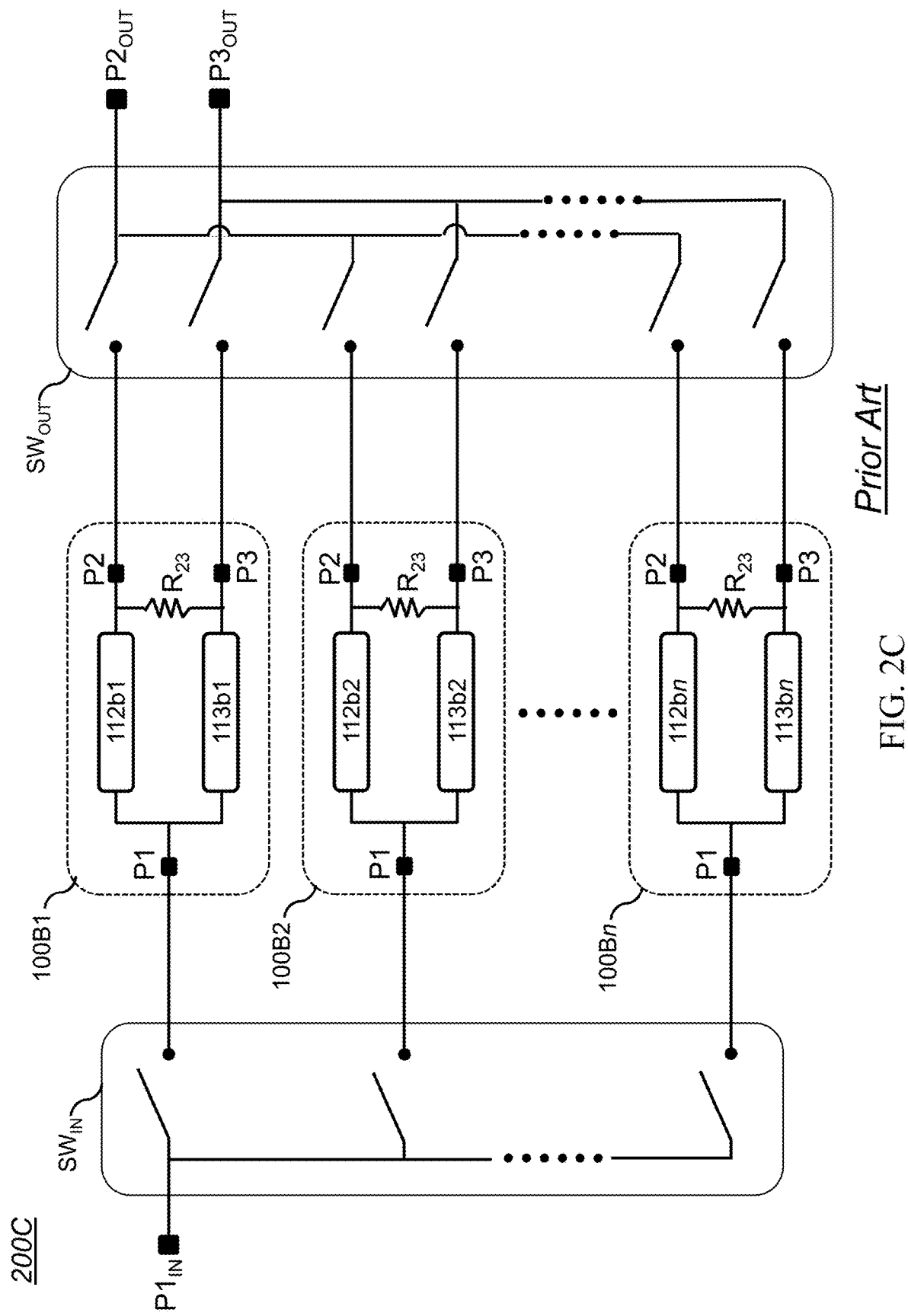
FIG. 2C shows a circuit of another exemplary prior art splitter that uses a plurality of selectable narrow band splitters for operation over a wider band.

With continued reference to FIG. 3C, a person skilled in the art would appreciate the improved out of band rejection provided by the tunable Wilkinson splitter (300A) of FIG. 3A when compared to the prior art cascaded splitter (200A) whose performance is shown in FIG. 2B. Increased out of band rejection is provided by the relatively narrower instantaneous bandwidth of the tunable Wilkinson splitter (300A). Furthermore, as described above, reduced number of components of the tunable splitter (300A) according to the present disclosure can allow for a reduced cost and better integration when compared to the prior art implementations of a wider band splitter (e.g., FIGS. 2A and 2C).

Figure 3D:
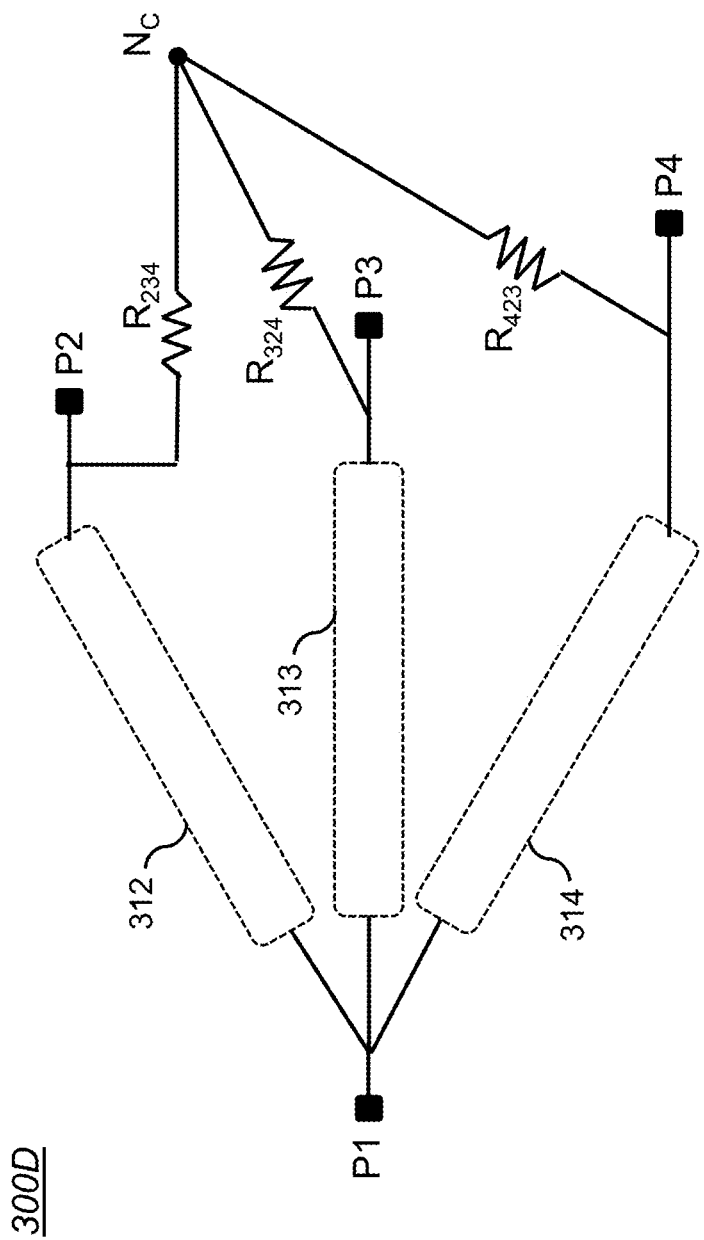
FIG. 3D shows a circuit of a multi-port tunable splitter according to an embodiment of the present disclosure including three separate branches.
Figure 3E:
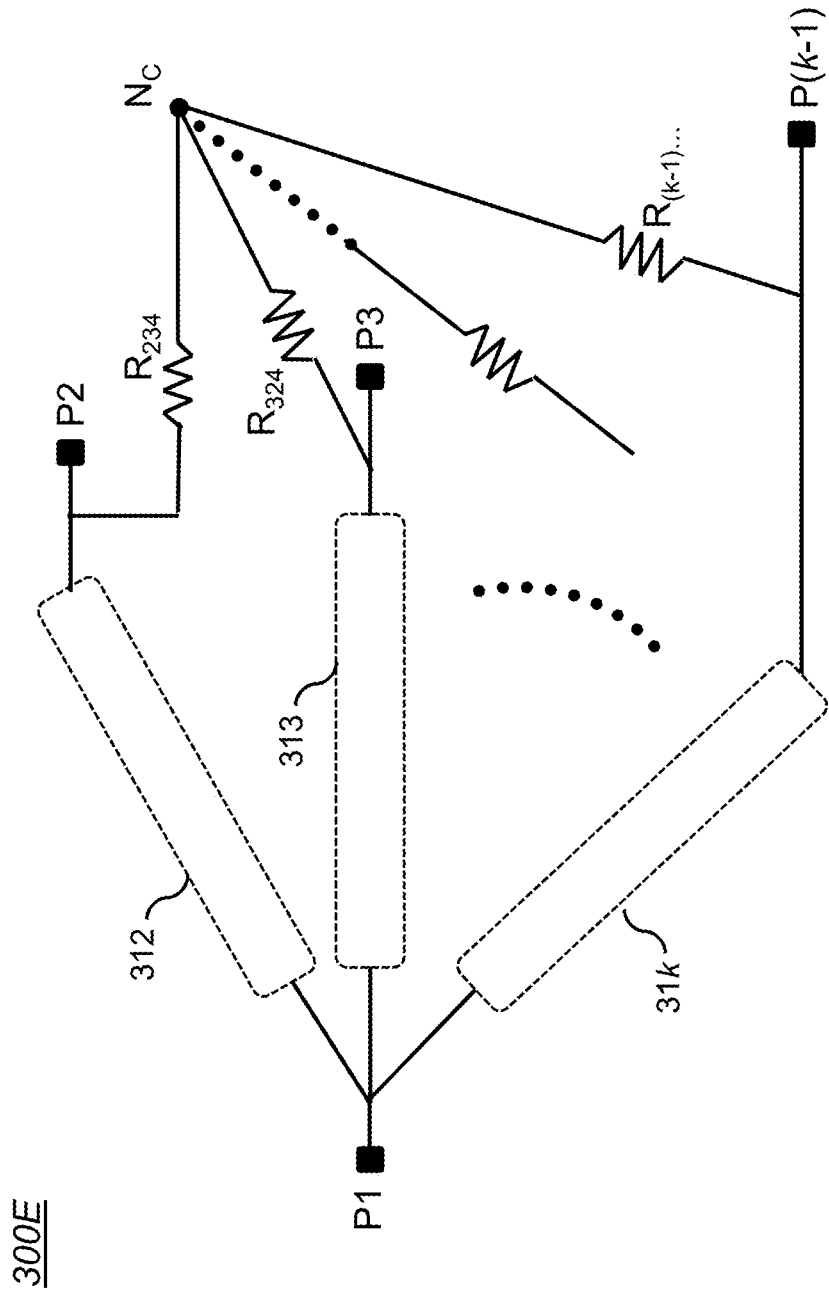
FIG. 3E shows a circuit of a multi-port tunable splitter according to an embodiment of the present disclosure including k separate branches.

As clearly understood to a person skilled in the art, teachings according to the present disclosure can equally apply to a multi-port (multi-branch) power splitter (and combiner) having a plurality of branches (split ports) beyond the exemplary two described above with reference to FIG. 3A. This is shown in FIG. 3D, wherein a tunable splitter (300D) may include three branches (312, 313, 314) coupled between the port P1 and respective ports P2, P3 and P4. Each such branch configured for adjustment via respective adjustable L and C elements in a similar manner as operation of the branches (312) and (313) described above with reference to FIG. 3A. Because of the higher number of branches (e.g., 3), adjustment of each branch can be configured to provide an equivalent impedance at a frequency of operation (e.g., center frequency) that is equal to $\sqrt{3}*Z_O$ and a phase shift through the branches that is equal (e.g., −90 degrees in reference to port P1). As shown in FIG. 3E, termination between any two ports (P2, P3), (P2, P4) and (P3, P4), is provided by respective termination resistors ($R_{234}$, $R_{324}$, $R_{423}$) coupled from respective ports (P2, P3, P4) to common node, $N_C$. Values of such resistors are configured such that the respective port sees a termination resistance that is equal to $\sqrt{3}*Z_O$ at the frequency of operation.

As shown in FIG. 3E, the configuration of FIG. 3D can be extended to any configuration having a plurality of k branches, k>1, such as for example, 2, 3, 4, 10, 20, etc . . . , each branch configured to provide an equivalent impedance at a frequency of operation (e.g., center frequency) that is equal to $\sqrt{k}*Z_O$ and a phase shift through the branches that is equal (e.g., −90 degrees in reference to port P1). Termination between any two of the ports (P2, P3, . . . , P(k−1)) may be provided by respective termination resistors ($R_{234}$, $R_{324}$, . . . , $R_{(k-1)}$ . . . ) coupled from respective ports (P2, P3, . . . , P(k−1)) to the common node, $N_C$. Values of such resistors are configured such that the respective port sees a termination resistance that is equal to $\sqrt{k}*Z_O$ at the frequency of operation. Furthermore, it should be noted that in such configurations shown in FIGS. 3D and 3E, not all of the branches need to be adjustable, or including adjustable L and C elements. According to some exemplary embodiments of the present disclosure, at least one of the branches may be adjustable, and the other branches fixed (e.g., include fix value L and C elements).

Figure 4A:
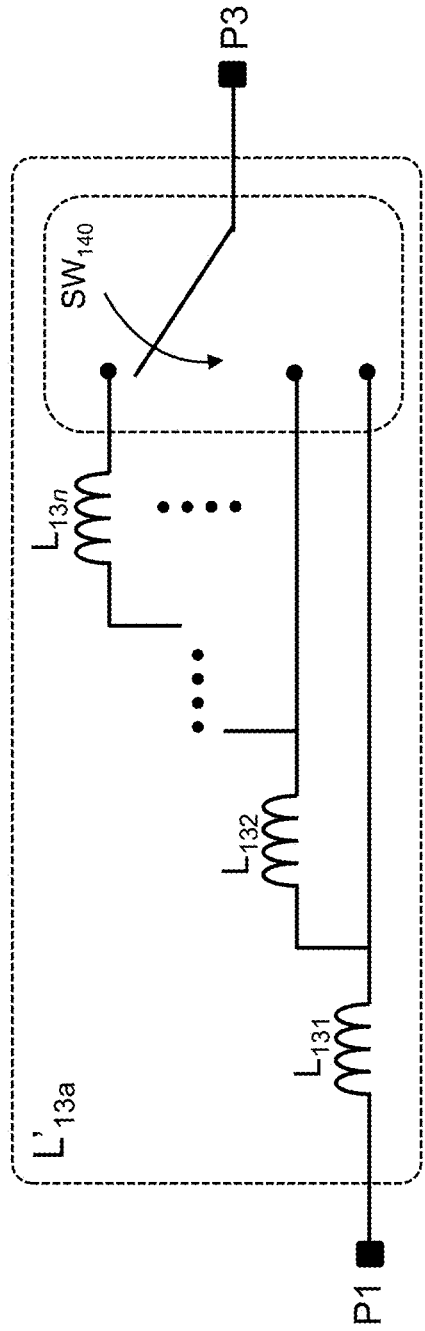
FIG. 4A shows a circuit of a tunable inductor according to an exemplary embodiment.
Figure 4B:
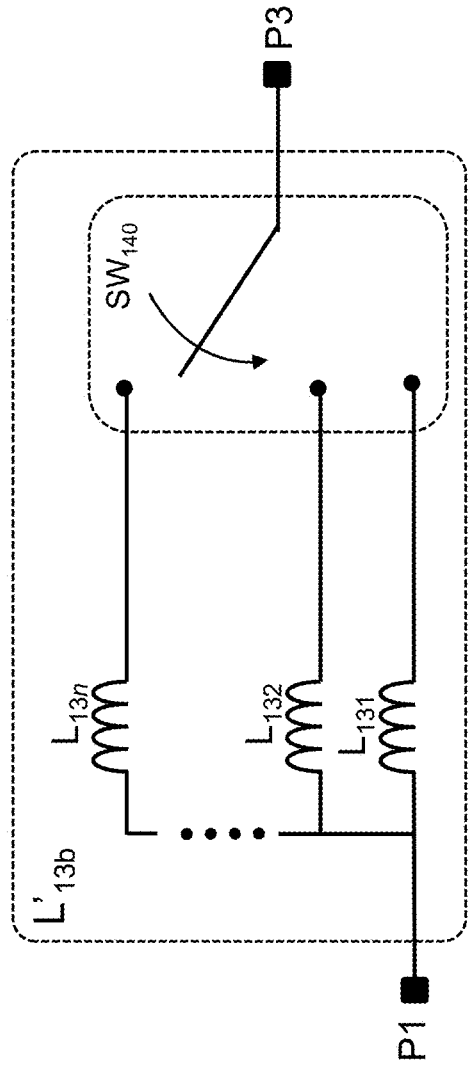
FIG. 4B shows a circuit of a tunable inductor according to another exemplary embodiment.

With reference back to FIG. 3A, each of the adjustable elements of the branches (312) and (313) may be any adjustable or variable or configurable or tunable reactive element known to a person skilled in the art, such as, for example, a digitally tunable reactive element, such as a digitally tunable capacitor or a digitally tunable inductor. FIG. 4A and FIG. 4B show two different exemplary circuits ($L'_{13a}$, $L'_{13b}$) for implementation of a digitally tunable inductor, such as, for example, the inductor $L'_{12}$ or $L'_{13}$ shown in FIG. 3A.

As can be seen in FIG. 4A, the circuit $L'_{13a}$ provides different values inductors between ports P1 and P3, based on a selection, by a switch $SW_{140}$, of a branch of a plurality of branches between ports P1 and P3 having different number of series connected inductors ($L_{131}$, $L_{132}$, . . . , $L_{13n}$). For example, a first branch (lower branch) includes only one inductor $L_{131}$ that can be switched between ports P1 and P3, a second branch includes two inductors $L_{131}$ and $L_{132}$ in series connection that can be switched between ports P1 and P3, and a last branch includes n inductors $L_{131}$, $L_{132}$, . . . , $L_{13n}$ in series connection that can be switched between ports P1 and P3. On the other hand, as can be seen in FIG. 4B, the circuit $L'_{13b}$ provides different value inductors that can be switched between ports P1 and P3, based on a selection, by a switch $SW_{140}$, of a branch of a plurality of branches between ports P1 and P3, each branch having a different value inductor $L_{131}$, $L_{132}$, . . . , or $L_{13n}$. For example, a first branch (lower branch) includes one inductor $L_{131}$ that can be switched between ports P1 and P3, a second branch includes one inductor $L_{132}$ that can be switched between ports P1 and P3, and a last branch includes one inductor $L_{13n}$ that can be switched between ports P1 and P3, wherein values (inductance) of the inductors $L_{131}$, $L_{132}$, . . . , and $L_{13n}$ are different from one another.

Figure 4C:
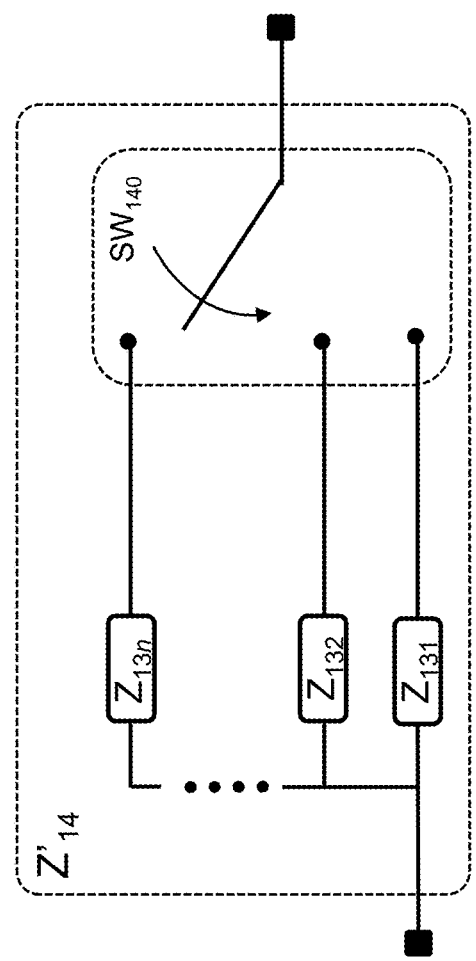
FIG. 4C shows a circuit of a tunable reactive element according to another exemplary embodiment.

A person skilled in the art would clearly understand that any of the two architectures shown in FIG. 4A and FIG. 4B can be used to implement any of the adjustable elements ($C'_{12}$, $L'_{12}$, $C'_{21}$) and ($C'_{13}$, $L'_{13}$, $C'_{31}$) of the branches (312) and (313). For example, the architecture shown in FIG. 4B can be used for implementation of any adjustable reactive (capacitor or inductor) element $Z'_{14}$ as shown in FIG. 4C, by substituting reactances ($Z_{131}$, $Z_{132}$, . . . , $Z_{13n}$) with capacitances (e.g., $C_{131}$, $C_{132}$, . . . , $C_{13n}$) to implement adjustable capacitors, and with inductances ($L_{131}$, $L_{132}$, . . . , $L_{13n}$) to implement adjustable inductors. It should be noted that effective values of the fixed capacitances and/or inductances used to implement the tunable capacitors and inductors may be in view of parasitic/stray elements inherent to a physical implementation/layout of a corresponding circuit such that in combination, desired performance of the adjustable branches (e.g., 312, 313 of FIG. 3A) at a given center frequency is obtained.

Figure 5A:
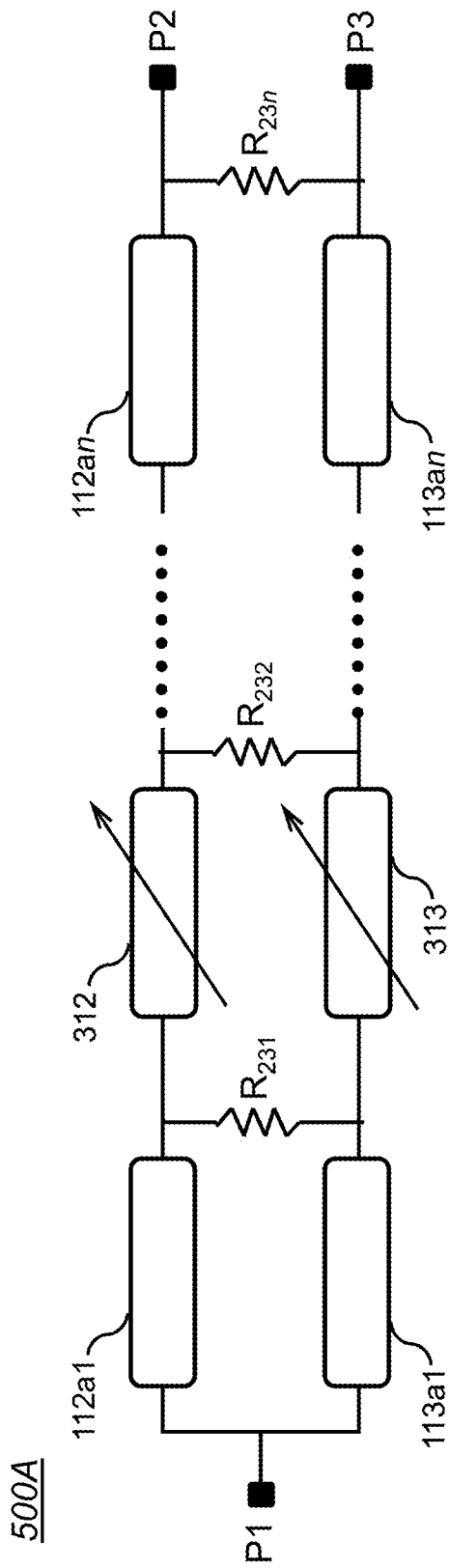
FIG. 5A shows a circuit of an exemplary splitter according to the present disclosure that uses a plurality of cascaded stages for operation over a wider band, at least one of the cascaded stages based on the tunable Wilkinson splitter of FIG. 3A.
Figure 5B:
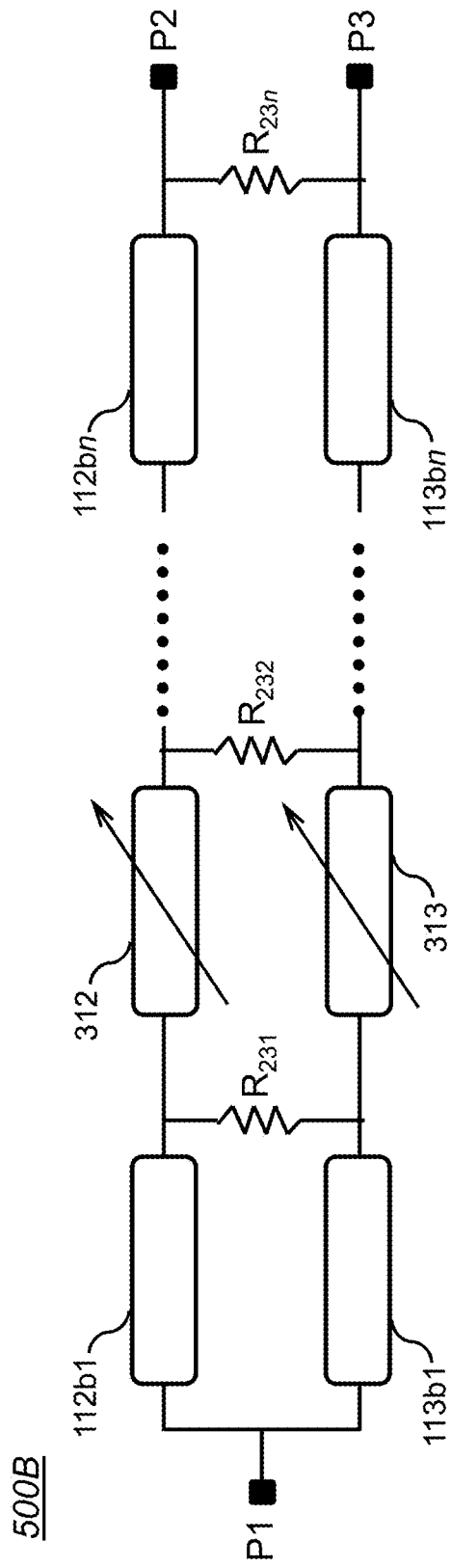
FIG. 5B shows a circuit of another exemplary splitter according to the present disclosure that uses a plurality of cascaded stages for operation over a wider band, at least one of the cascaded stages based on the tunable Wilkinson splitter of FIG. 3A.

FIG. 5A shows a circuit of an exemplary (power) splitter (500A) according to the present disclosure that uses a plurality of cascaded stages ($112a1$, $113a1$, $R_{231}$), . . . , ($112an$, $113an$, $R_{23n}$), for operation over a wider band, at least one stage (312, 313, $R_{232}$) of the cascaded stages based on the tunable Wilkinson splitter of FIG. 3A. A person skilled in the art would clearly understand that the configuration (500A) is based on the prior art configuration (200A) described above with reference to FIG. 2A, wherein at least one stage is a tunable stage based on the tunable splitter (300A) of FIG. 3A. Accordingly, a wider instantaneous bandwidth can be obtained while allowing further tuning of a center frequency of operation via the tunable branches (312) and (313). As shown in FIG. 5A, the other stages can include transmission lines (112a1, 113a1, etc.) branches based on the distributed elements model described above with reference to FIG. 1A, or, as shown in FIG. 5B, can include LC branches (112b1, 113b1, etc.) based on lumped elements model described above with reference to FIG. 1B. It should be noted that although impractical, the stages that are not according to the tunable Wilkinson splitter of FIG. 3A, may include a combination of lumped elements stages and distributed elements stages.

Figure 5C:
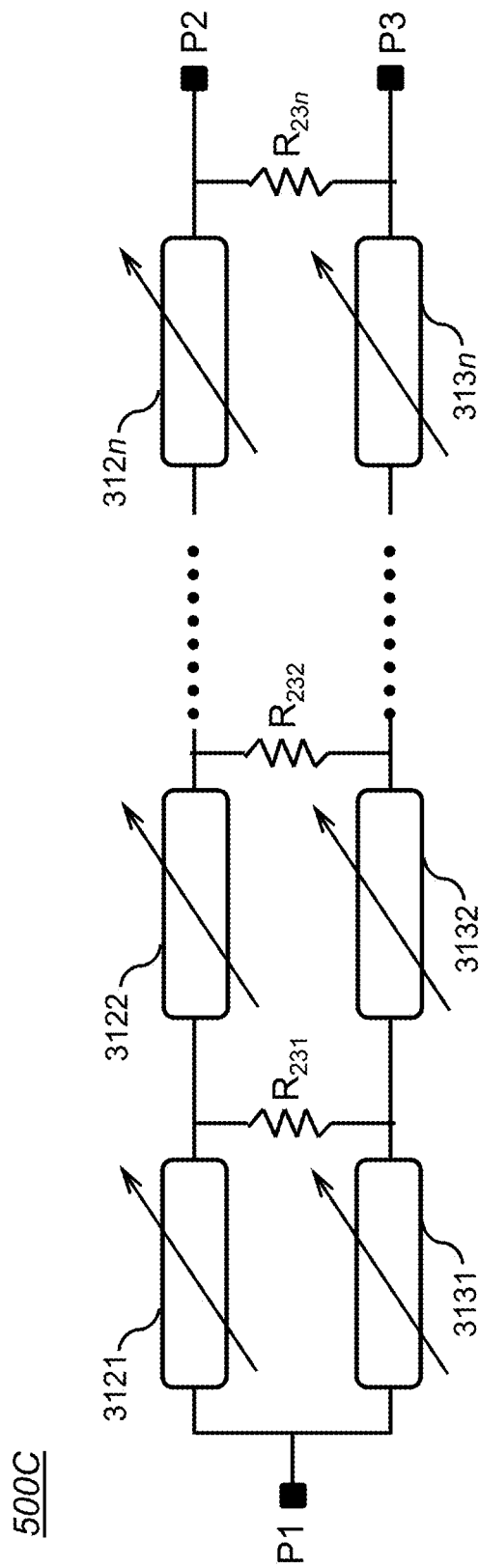
FIG. 5C shows a circuit of an exemplary splitter according to the present disclosure that uses a plurality of cascaded stages for operation over a wider band, each of the plurality of cascaded stages based on the tunable Wilkinson splitter of FIG. 3A.

It should be noted that the cascaded stages of the configurations (500A) or (500B) may include one or more stages that are based on the tunable Wilkinson splitter of FIG. 3A, which therefore include branches (e.g., 312, 313) having adjustable elements per FIG. 3A. A person skilled in the art will appreciate increased tuning of a center frequency of operation based on an increased number of tunable stages. Furthermore, bandwidth may be controlled not only with respect to its center frequency, but also its spread (width). As shown in FIG. 5C, according to an exemplary embodiment of the present disclosure, all of the cascaded stages (3121, 3131, $R_{231}$), ..., (312n, 313n, $R_{23n}$), are tunable stages according to FIG. 3A. Such configuration can allow complete control of bandwidth (spread) and center frequency of the configuration.

FIG. 6 is a process chart (600) showing various steps of a method for providing a tunable Wilkinson splitter (TWS). As can be seen in FIG. 6, such steps comprise: providing a first tunable LC branch, per step (610); providing a second tunable LC branch, per step (620); coupling the first tunable LC branch between a first port and a second port, per step (630); coupling the second tunable LC branch between the first port and a third port, per step (640); coupling a termination resistor between the second port and the third port, per step (650); adjusting reactive elements of the first and the second tunable LC branches to tune the TWS for operation according to a Wilkinson splitter at a first center frequency, per step (660); and adjusting reactive elements of the first and the second tunable LC branches to tune the TWS for operation according to a Wilkinson splitter at a second center frequency, per step (670).

It should be noted that the various embodiments of the tunable Wilkinson splitter according to the present disclosure, may be implemented as a monolithically integrated circuit (IC) according to any fabrication technology and process known to a person skilled in the art.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

The term "amplifier" as used in the present disclosure is intended to refer to amplifiers comprising single or stacked transistors configured as amplifiers, and can be used, for example, as power amplifiers (PAs) and/or low noise amplifiers (LNAs). An amplifier can refer to a device that is configured to amplify a signal input to the device to produce an output signal of greater magnitude than the magnitude of the input signal. Stacked transistor amplifiers are described for example in U.S. Pat. No. 7,248,120, issued on Jul. 24, 2007, entitled "Stacked Transistor Method and Apparatus", U.S. Pat. No. 7,123,898, issued on Oct. 17, 2006, entitled "Switch Circuit and Method of Switching Radio Frequency Signals", U.S. Pat. No. 7,890,891, issued on Feb. 15, 2011, entitled "Method and Apparatus Improving Gate Oxide Reliability by Controlling Accumulated Charge", and U.S. Pat. No. 8,742,502, issued on Jun. 3, 2014, entitled "Method and Apparatus for use in Improving Linearity of MOSFETs Using an Accumulated Charge Sink—Harmonic Wrinkle Reduction", the disclosures of which are incorporated herein by reference in their entirety. As used herein, the term "amplifier" can also be applicable to amplifier modules and/or power amplifier modules having any number of stages (e.g., pre-driver, driver, final), as known to those skilled in the art.

The term "MOSFET", as used in this disclosure, means any field effect transistor (FET) with an insulated gate and comprising a metal or metal-like, insulator, and semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable IC technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, the invention may be implemented in other transistor technologies such as bipolar, GaAs HBT, GaN HEMT, GaAs pHEMT, and MESFET technologies. However, the inventive concepts described above are particularly useful with an SOI-based fabrication process (including SOS), and with fabrication processes having similar characteristics. Fabrication in CMOS on SOI or SOS enables low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted or voltage and/or logic signal polarities reversed depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

A number of embodiments according to the present disclosure have been described. It is to be understood that various modifications may be made without departing from the spirit and scope of such embodiments. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the disclosure, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

The invention claimed is:

1. A tunable Wilkinson splitter (TWS), comprising:
a first tunable LC branch coupled between a first port and a second port; a second tunable LC branch coupled between the first port and a third port; and a termination resistor coupled between the second port and the third port, wherein each of the first and the second tunable LC branches includes a first adjustable capacitor, an additional adjustable capacitor and at least one adjustable inductor, and
wherein the first and the second tunable LC branches are configured to be tuned via the respective adjustable capacitors and at least one adjustable inductor to tune the TWS for operation according to a Wilkinson splitter at each center frequency of a plurality of different center frequencies, and wherein each of the at least one adjustable inductor is coupled between the respective adjustable capacitors, and the respective adjustable capacitors are arranged in a shunted configuration.

2. The TWS according to claim 1, wherein for each center frequency of the plurality of different center frequencies, the TWS behaves like a Wilkinson splitter operating at said center frequency.

3. The TWS according to claim 1, wherein different performance bandwidths of the TWS associated with the plurality of different center frequencies overlap to provide a wider combined performance bandwidth.

4. The TWS according to claim 3, wherein the performance is based on at least one of: a) an isolation between the second port and the third port; or b) an insertion loss.

5. The TWS according to claim 1, wherein tuning of each of the first and second tunable LC branches for operation according to a center frequency of the plurality of different center frequencies comprises:
adjusting the respective adjustable capacitors and at least one adjustable inductor of the first and second tunable LC branches to provide, at said center frequency:

i) an impedance equal to $\sqrt{2}*Z_O$ for each of the first and second tunable LC branches, and
ii) a same phase shift through each of the first and second tunable LC branches,
wherein the impedance $Z_O$ is a target system impedance, and a value of the termination resistor is equal to $\sqrt{2}*Z_O$.

6. A communication system for communication over a plurality of frequency bands, the communication system comprising:
a tunable splitter according to the TWS of claim 1.

7. The communication system of claim 6, wherein the communication system is configured to communicate over the plurality of frequency bands based on tuning of the TWS for operation according to a plurality of different center frequencies.

8. The communication system of claim 6, wherein the plurality of frequency bands span over a frequency range from 1 GHz to 10 GHz.

9. The communication system of claim 6, wherein the plurality of frequency bands span over a frequency range from 5 GHz to 8 GHz.

10. A monolithically integrated circuit comprising:
a tunable splitter according to the TWS of claim 1.

11. The monolithically integrated circuit of claim 10, wherein the circuit is monolithically integrated by using a fabrication technology comprising one of: a) silicon-on-insulator (SOI) technology, and b) silicon-on-sapphire technology (SOS).

12. An electronic module comprising the monolithically integrated circuit according to claim 10.

13. The multi-stage tunable splitter according to claim 1, further comprising:
one or more additional LC branches coupled between the first port and respective one or more additional ports,
wherein each of the one or more additional LC branches includes a first adjustable capacitor, an additional adjustable capacitor and at least one adjustable inductor.

14. The multi-stage tunable splitter according to claim 13, further comprising:
one or more additional termination resistors coupled to the second port, the third port and the one or more additional ports,
wherein the termination resistor and the one or more additional resistors are further coupled to a common node.

15. The TWS according to claim 1, wherein the first adjustable capacitor, the additional adjustable capacitor, or the adjustable inductor, is arranged according to an adjustable reactive element that comprises:
a plurality of reactive elements having respective first and second ends, the respective first ends coupled to a first terminal of the adjustable reactive element; and
a single-pole multi-throw (SPMT) switch, a pole of the SPMT switch coupled to a second terminal of the adjustable reactive element, and throws of the SPMT switch coupled to the respective second ends of the plurality of reactive elements.

16. The TWS according to claim 1, wherein the first adjustable capacitor, the additional adjustable capacitor, or the adjustable inductor, is arranged according to an adjustable reactive element that comprises:
a plurality, N, of reactive elements, Z1, Z2, . . . , ZN, having respective first and second ends; and a single-pole multi-throw (SPMT) switch,
wherein
the first end of Z1 is coupled to a first terminal of the adjustable reactive element,
the first end of Z2 is coupled to the second end of Z1,
the first end of Z3 is coupled to the second end of Z2, . . . ,
the first end of ZN is coupled to the second end of Z(N−1),
throws of the SPMT switch are coupled to the respective second ends of the plurality of reactive elements, and
a pole of the SPMT switch is coupled to a second terminal of the adjustable reactive element.

17. The TWS according to claim 1, wherein tuning of each of the first and second tunable LC branches for operation according to a center frequency of the plurality of different center frequencies is based on adjusting of the first adjustable capacitor, the additional adjustable capacitor, and/or the adjustable inductor of the respective LC networks to provide, at said center frequency:
i) an impedance near or equal to $\sqrt{2}*Z_O$ for each of the respective LC networks, and
ii) a same phase shift through the respective LC networks, wherein the impedance $Z_O$ is a target system impedance, and a value of the termination resistor is equal to $2*Z_O$.

18. A tunable Wilkinson splitter (TWS), comprising:
a first tunable LC branch coupled between a first port and a second port; a second tunable LC branch coupled between the first port and a third port; and a termination resistor coupled between the second port and the third port,
wherein each of the first and the second tunable LC branches includes at least one adjustable capacitor and at least one adjustable inductor, wherein the first and the second tunable LC branches are configured to be tuned via the respective at least one adjustable capacitor and at least one adjustable inductor to tune the TWS for operation according to a Wilkinson splitter at each center frequency of a plurality of different center frequencies, and wherein each of the first and the second tunable LC branches further includes: an additional adjustable capacitor, each of the at least one adjustable capacitor and the additional adjustable capacitor arranged in a shunted configuration,
wherein the at least one adjustable inductor is coupled between the at least one adjustable capacitor and the additional adjustable capacitor.

19. The TWS according to claim 18, wherein the at least one adjustable capacitor, the additional adjustable capacitor, or the adjustable inductor, is arranged according to an adjustable reactive element that comprises:
a plurality of reactive elements having respective first and second ends, the respective first ends coupled to a first terminal of the adjustable reactive element; and
a single-pole multi-throw (SPMT) switch, a pole of the SPMT switch coupled to a second terminal of the adjustable reactive element, and throws of the SPMT switch coupled to the respective second ends of the plurality of reactive elements.

20. The TWS according to claim 18, wherein the at least one adjustable capacitor, the additional adjustable capacitor, or the adjustable inductor, is arranged according to an adjustable reactive element that comprises:
a plurality, N, of reactive elements, Z1, Z2, . . . , ZN, having respective first and second ends; and
a single-pole multi-throw (SPMT) switch,
wherein
the first end of Z1 is coupled to a first terminal of the adjustable reactive element,
the first end of Z2 is coupled to the second end of Z1,
the first end of Z3 is coupled to the second end of Z2, . . . ,
the first end of ZN is coupled to the second end of Z(N−1),
throws of the SPMT switch are coupled to the respective second ends of the plurality of reactive elements, and
a pole of the SPMT switch is coupled to a second terminal of the adjustable reactive element.

21. The TWS according to claim 18, wherein tuning of each of the first and second tunable LC branches for operation according to a center frequency of the plurality of different center frequencies is based on adjusting of the at least one adjustable capacitor, the additional adjustable capacitor, and the adjustable inductor of the respective LC networks to provide, at said center frequency:
i) an impedance equal to $\sqrt{2}*Z_O$ for each of the respective LC networks, and
ii) a same phase shift through the respective LC networks, wherein the impedance $Z_O$ is a target system impedance, and a value of the termination resistor is equal to $2*Z_O$.

* * * * *